(12) United States Patent
Khan et al.

(10) Patent No.: US 10,021,999 B1
(45) Date of Patent: Jul. 17, 2018

(54) DECORATIVE HEADSTONE ACCESSORY APPARATUS

(71) Applicants: Rasheed Khan, Bronx, NY (US); Rafeena Khan, Bronx, NY (US)

(72) Inventors: Rasheed Khan, Bronx, NY (US); Rafeena Khan, Bronx, NY (US)

( * ) Notice: Subject to any disclaimer, the term of this patent is extended or adjusted under 35 U.S.C. 154(b) by 27 days.

(21) Appl. No.: 14/982,457

(22) Filed: Dec. 29, 2015

(51) Int. Cl.
*A47G 7/00* (2006.01)
*A47G 7/06* (2006.01)
*A47G 1/06* (2006.01)
*F16M 13/02* (2006.01)

(52) U.S. Cl.
CPC ............... *A47G 7/06* (2013.01); *A47G 1/065* (2013.01); *F16M 13/022* (2013.01)

(58) Field of Classification Search
CPC . A47G 7/044; A47G 7/06; A47G 7/02; A01G 9/02
USPC ............... 47/33, 41.01, 39; 248/27.8, 226.11
See application file for complete search history.

(56) References Cited

U.S. PATENT DOCUMENTS

| | | | | |
|---|---|---|---|---|
| 3,310,911 | A * | 3/1967 | Boser | A47G 7/044 248/27.8 |
| 4,640,045 | A * | 2/1987 | Nesbitt | A01G 9/00 47/39 |
| 5,687,515 | A * | 11/1997 | Rodrigues | E04H 13/003 40/124.5 |
| 5,822,918 | A * | 10/1998 | Helfman | A47G 7/044 248/231.41 |
| 6,132,054 | A | 10/2000 | Rogers et al. | |
| 6,324,784 | B1 | 12/2001 | Bina | |
| 6,564,506 | B1 | 5/2003 | Leger | |
| D568,727 | S * | 5/2008 | Walker | D8/380 |
| 7,992,833 | B1 * | 8/2011 | Goodman | A47G 25/0614 248/298.1 |
| 8,523,118 | B2 * | 9/2013 | Weder | A01G 5/04 248/151 |
| 9,107,526 | B2 * | 8/2015 | Rife | A47G 29/083 |
| 9,307,700 | B1 * | 4/2016 | Schmitt | G09F 17/00 |
| 9,736,992 | B1 * | 8/2017 | Barry | A01G 5/04 |
| 9,743,593 | B1 * | 8/2017 | Lawson | A01G 5/04 |
| 2003/0137832 | A1 * | 7/2003 | Little | A47G 7/045 362/183 |
| 2008/0308695 | A1 * | 12/2008 | Lambert | A47G 7/044 248/226.11 |
| 2011/0036001 | A1 * | 2/2011 | Aker | A47G 7/044 47/41.12 |

* cited by examiner

*Primary Examiner* — Monica Williams

(57) ABSTRACT

A decorative headstone accessory apparatus including an adjustable length slotted arm, an L-shaped first bracket attached to a left end of the slotted arm, and a second bracket attached to a right end of the slotted arm. A left side of each of a pair of linear arm supports is attached to the second bracket. A vase holder is suspended within an opening in each of the pair of arm supports. A hinged double picture frame has a middle section that is attached to a right side of each of the pair of arm supports. A pivotable extension is attached to the double picture frame, with the extension having a circular candle guardrail. Each of the first bracket and the second bracket is configured to removably secure to a left surface of a headstone.

3 Claims, 5 Drawing Sheets

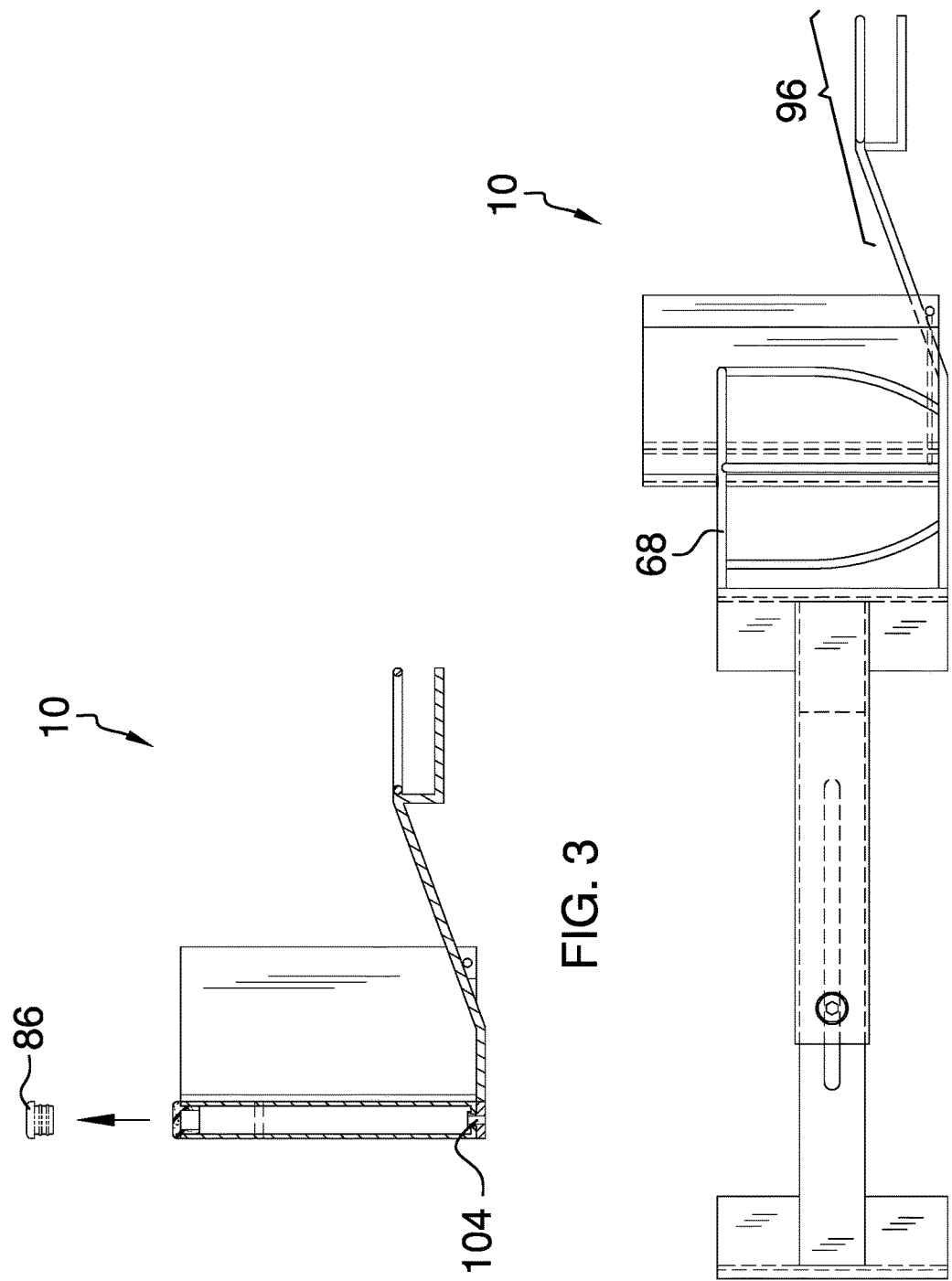

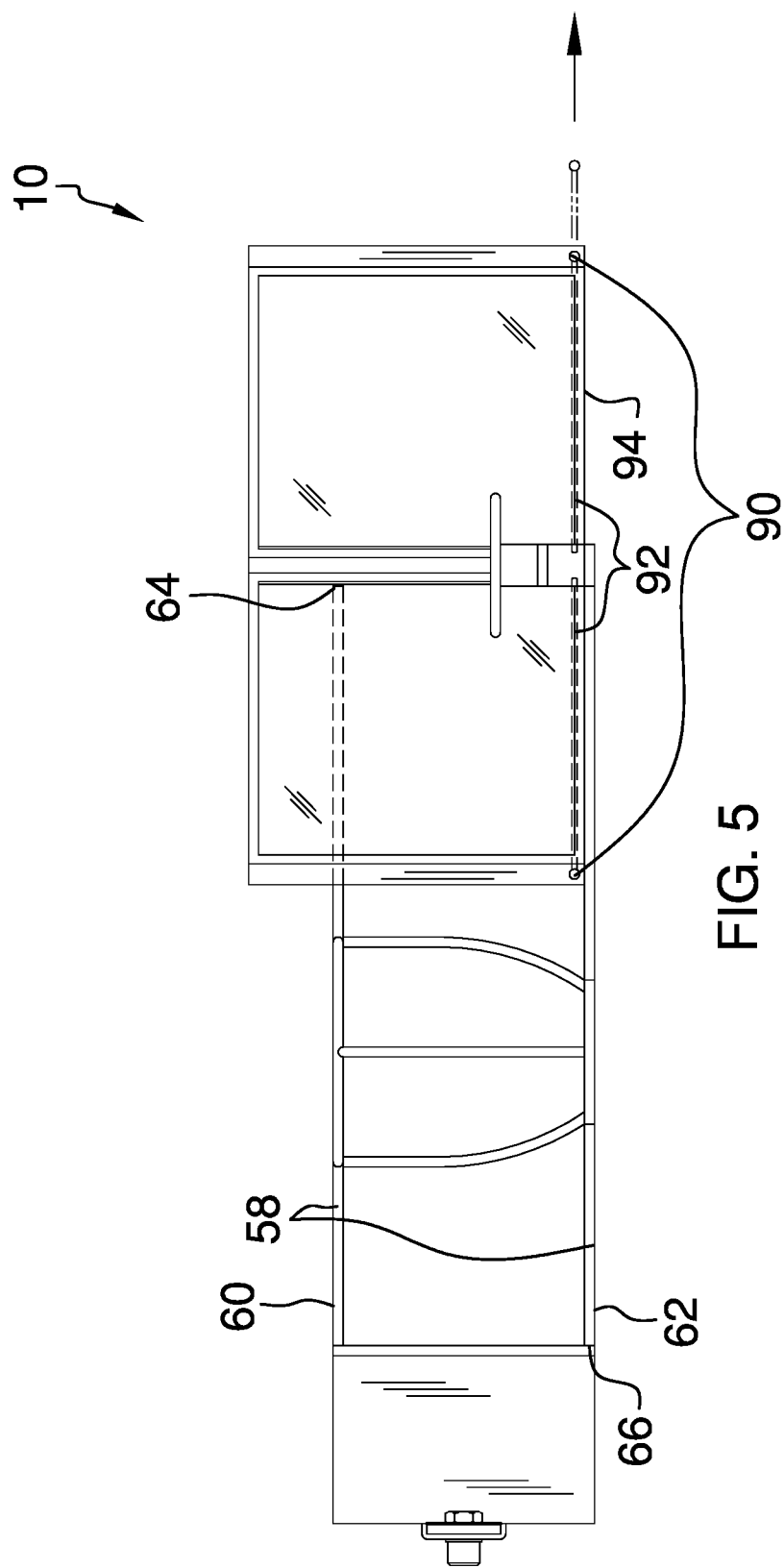

DECORATIVE HEADSTONE ACCESSORY APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of headstone accessories are known in the prior art. However, what has been needed is a decorative headstone accessory apparatus including an adjustable length slotted arm, an L-shaped first bracket attached to a left end of the slotted arm, and a second bracket attached to a right end of the slotted arm. What has been further needed is for a left side of each of a pair of linear arm supports to be attached to the second bracket, with a vase holder suspended within an opening in each of the pair of arm supports. Lastly, what has been needed is a hinged double picture frame attached to a right side of each of the pair of arm supports, with a pivotable extension attached to the double picture frame. Each of the first bracket and the second bracket is configured to removably secure to a left surface of a headstone such that the pair of arm supports is disposed in front of a front surface of the headstone. A flag is configured to be removably disposed within the middle section of the double picture frame. The extension has a candle guardrail that is configured to encircle a candle removably disposed atop the extension proximal the front edge. The decorative headstone accessory apparatus thus provides a unique solution to keeping a grave orderly and clean, while ensuring that pictures, flowers, and other memorabilia remain in place for an extended period of time. Since the apparatus will be continuously exposed to the outside elements, it is envisioned that the apparatus will be built from a rustproof and weatherproof material and that the double picture frame will be properly sealed and waterproofed.

FIELD OF THE INVENTION

The present invention relates to headstone accessories, and more particularly, to a decorative headstone accessory apparatus.

SUMMARY OF THE INVENTION

The general purpose of the present decorative headstone accessory apparatus, described subsequently in greater detail, is to provide a decorative headstone accessory apparatus which has many novel features that result in a decorative headstone accessory apparatus which is not anticipated, rendered obvious, suggested, or even implied by prior art, either alone or in combination thereof.

To accomplish this, the present decorative headstone accessory apparatus includes an adjustable length slotted arm having a right end, a left end, and a removable bolt. The adjustable length slotted arm has an optional length in three distinct ranges: 8 inches to 12 inches, 12 inches to 16 inches, and 16 inches to 24 inches. An L-shaped first bracket has a first portion and a frontward facing second portion. Each of the first portion and the second portion has an exterior surface and an interior surface. The left end of the slotted arm is medially attached to the exterior surface of the second portion. A second bracket has a rearward facing first section, a second section, and a frontward facing third section. Each of the first section, the second section, and the third section has an external surface, an internal surface, a right edge, a left edge, a top edge, and a bottom edge. The right edge of the first section is attached at an angle of ninety degrees to the left edge of the second section, and the left edge of the third section is attached at an angle of ninety degrees to the right edge of the second section. The right end of the slotted arm is medially attached to the external surface of the first section of the second bracket. A length of the first section of the second bracket is equal to a length of the second portion of the first bracket. A length of the second section of the second bracket is equal to a length of the first portion of the first bracket.

A pair of linear arm supports includes an upper arm support and a lower arm support. Each of the upper arm support and the lower arm support has a right side and a left side. The left side of each of the upper arm support and the lower arm support is attached to the internal surface of the third section of the second bracket proximal the right edge. The left side of the upper arm support is disposed proximal the top edge of the third section of the second bracket, and the left side of the lower arm support is disposed proximal the bottom edge of the third section of the second bracket. A vase holder having a circular top ring and a circular base is suspended within an opening in each of the upper arm support and the lower arm support at approximately one-third of a length of each of the pair of arm supports from the left side of each of the upper arm support and the lower arm support. The vase holder optionally includes a plurality of convexly curved substantially vertical columns, with each of the vertical columns disposed between the top ring and the base of the vase holder.

The decorative headstone accessory apparatus further includes a hinged double picture frame having a first picture frame, a second picture frame, a hollow cylindrical middle section disposed between the first picture frame and the second picture frame, a cap removably disposed within an upper surface of the middle section, and a pair of removable pins. One of the pair of pins is removably and slidably disposed within one of a pair of slots continuously disposed along a bottom surface of each of the first picture frame and the second picture frame. Each of the pair of slots allows a user to interchange a plurality of pictures within the double picture frame, and each of the pair of pins secures each of the pair of slots. The middle section of the double picture frame is attached to the right side of each of the upper arm support and the lower arm support. The hollow middle section of the double picture frame allows for the drainage of rainwater. An optional diameter of the middle section of the double picture frame is 0.375 inches. A frontward facing pivotable extension has a back edge, a front edge, and a circular candle guardrail attached to the extension proximal the front edge. The back edge of the extension is pivotally attached to the double picture frame proximal a lower surface of the middle section, and the candle guardrail is outwardly disposed above the front edge of the extension.

Each of the first bracket and the second bracket is configured to removably secure a left surface of a headstone such that the pair of arm supports is disposed in front of a front surface of the headstone. Although not disclosed in the claims, it is envisioned that the apparatus can be configured to attach to a right surface of the headstone as well. A flag is configured to be removably disposed within the double picture frame middle section. The candle guardrail of the extension is configured to encircle a candle removably disposed atop the extension proximal the front edge. The interior surface of each of the first portion and the second portion of the first bracket and the internal surface of each of the first section, the second section, and the third section of the second bracket optionally has a rubberized covering in order to better protect the headstone from damage caused by the removable attachment of the first bracket and the second bracket.

Thus has been broadly outlined the more important features of the present decorative headstone accessory apparatus so that the detailed description thereof that follows may be better understood and in order that the present contribution to the art may be better appreciated.

BRIEF DESCRIPTION OF THE DRAWINGS

Figures
FIG. 3 is a cross-sectional view taken along line 3-3 of FIG. 1.
FIG. 4 is a side elevation view.
FIG. 5 is a front elevation view.

DETAILED DESCRIPTION OF THE DRAWINGS

Figure 1:
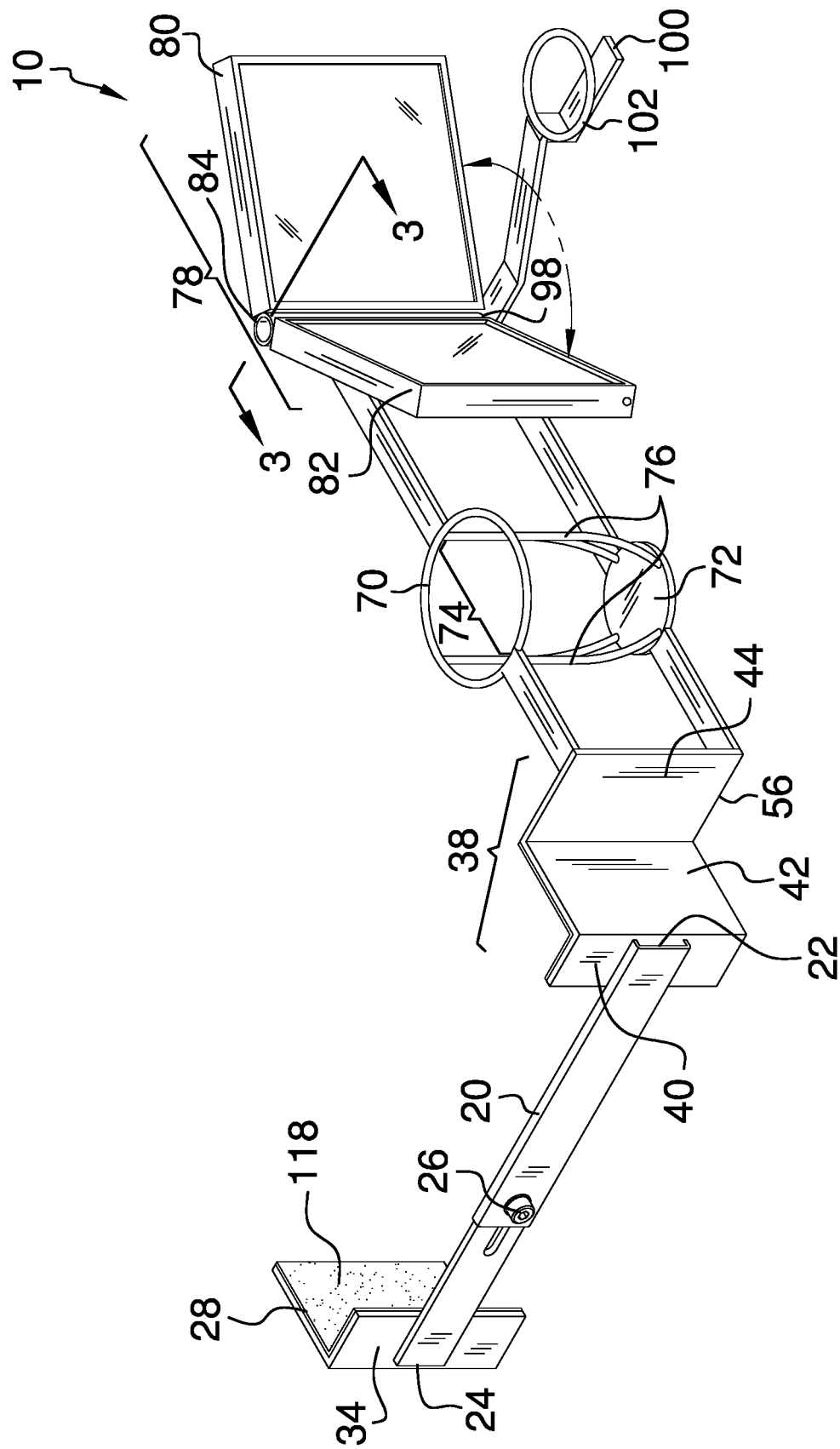
FIG. 1 is a front isometric view.
Figure 2:
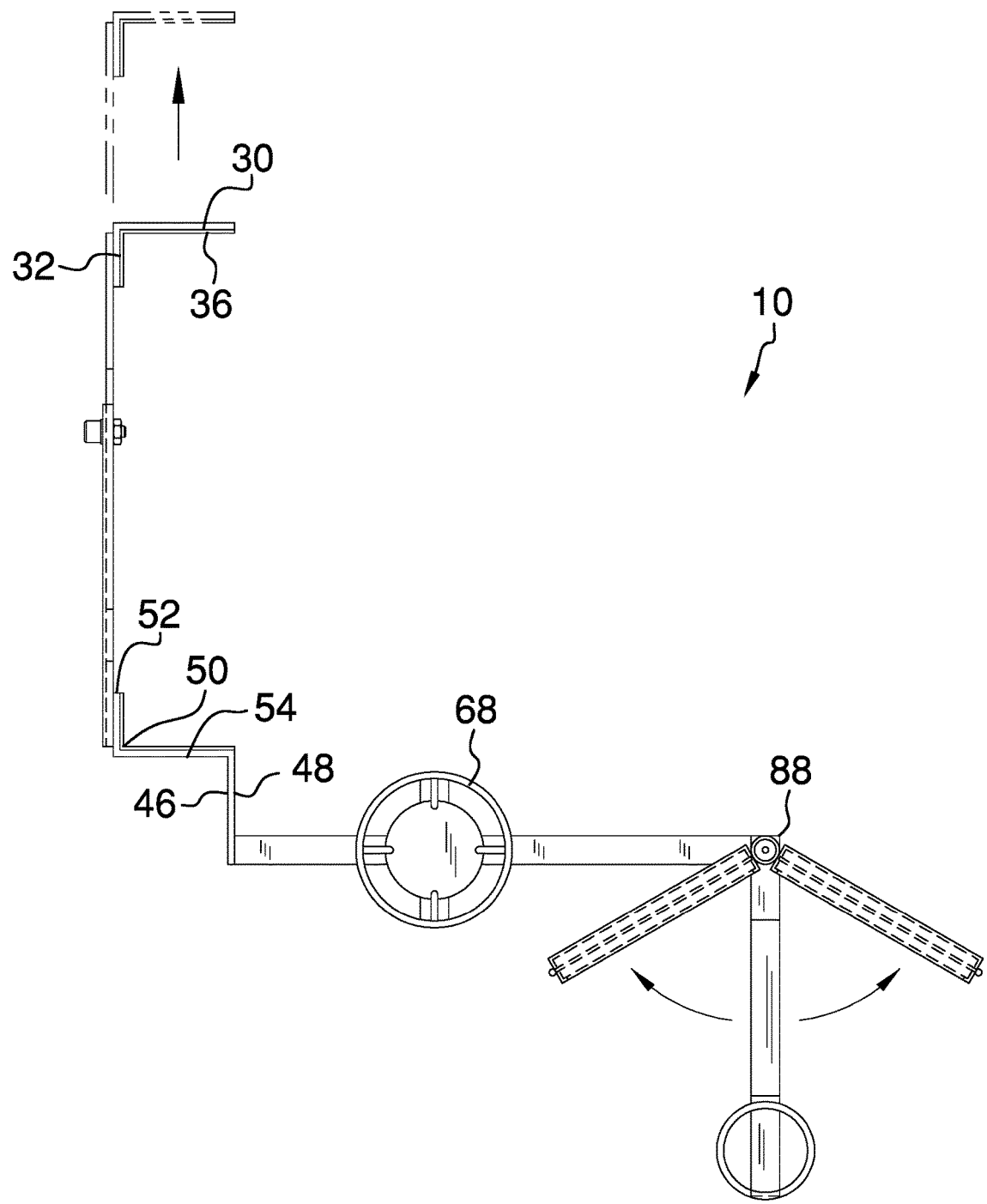
FIG. 2 is a top plan view.
Figure 6:
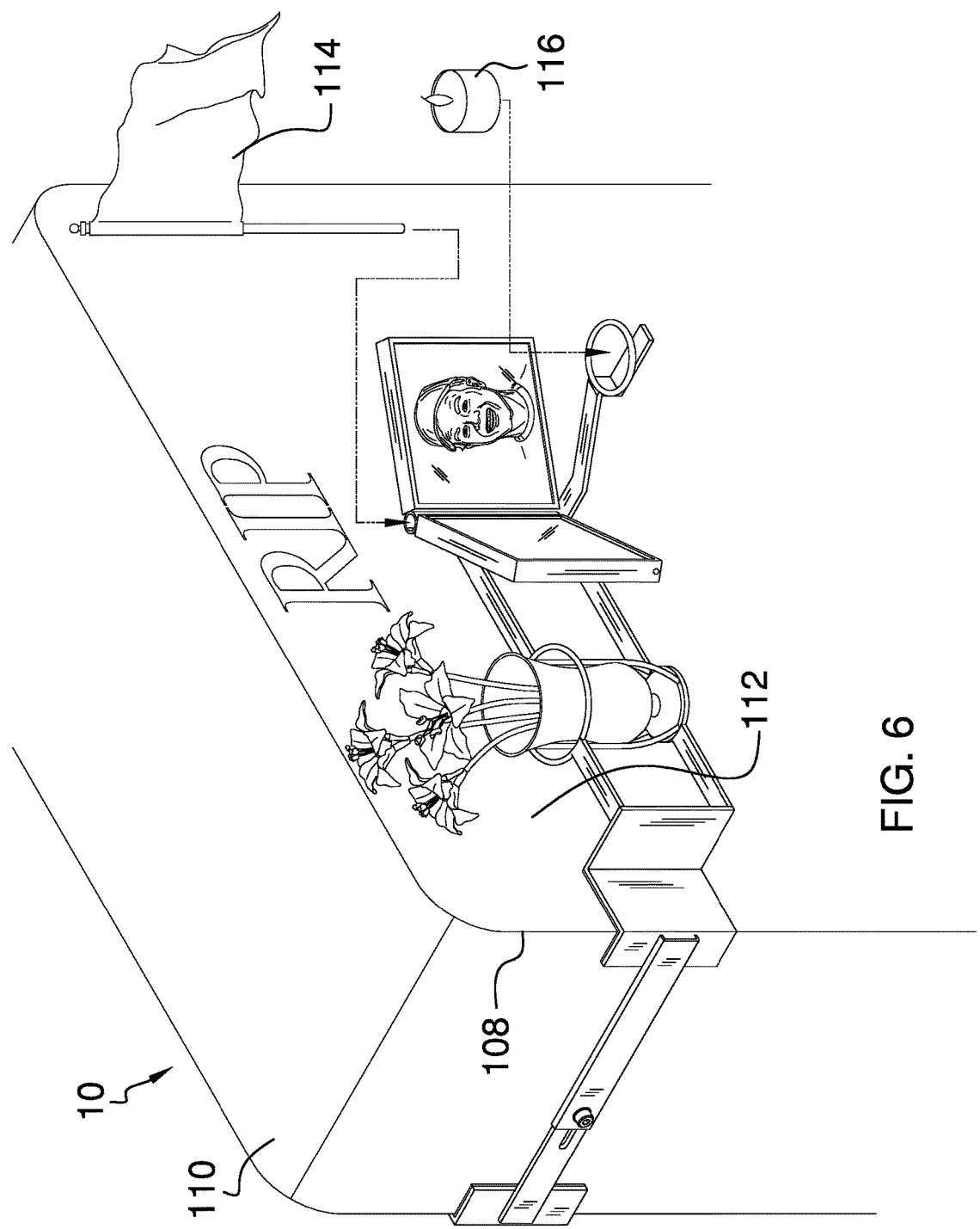
FIG. 6 is an in-use view.

With reference now to the drawings, and in particular FIGS. 1 through 6 thereof, an example of the instant decorative headstone accessory apparatus employing the principles and concepts of the present decorative headstone accessory apparatus and generally designated by the reference number 10 will be described.

Referring to FIGS. 1 through 6 the present decorative headstone accessory apparatus 10 is illustrated. The decorative headstone accessory apparatus 10 includes an adjustable length slotted arm 20 having a right end 22, a left end 24, and a removable bolt 26. An L-shaped first bracket 28 has a first portion 30 and a frontward facing second portion 32. Each of the first portion 30 and the second portion 32 has an exterior surface 34 and an interior surface 36. The left end 24 of the slotted arm 20 is medially attached to the exterior surface 34 of the second portion 32. A second bracket 38 has a rearward facing first section 40, a second section 42, and a frontward facing third section 44. Each of the first section 40, the second section 42, and the third section 44 has an external surface 46, an internal surface 48, a right edge 50, a left edge 52, a top edge 54, and a bottom edge 56. The right edge 50 of the first section 40 is attached at an angle of ninety degrees to the left edge 52 of the second section 42, and the left edge 52 of the third section 44 is attached at an angle of ninety degrees to the right edge 50 of the second section 42. The right end 22 of the slotted arm 20 is medially attached to the external surface 46 of the first section 40 of the second bracket 38. A length of the first section 40 of the second bracket 38 is equal to a length of the second portion 32 of the first bracket 28. A length of the second section 42 of the second bracket 38 is equal to a length of the first portion 30 of the first bracket 28.

A pair of linear arm supports 58 includes an upper arm support 60 and a lower arm support 62. Each of the upper arm support 60 and the lower arm support 62 has a right side 64 and a left side 66. The left side 66 of each of the upper arm support 60 and the lower arm support 62 is attached to the internal surface 48 of the third section 44 of the second bracket 38 proximal the right edge 50. The left side 66 of the upper arm support 60 is disposed proximal the top edge 54 of the third section 44 of the second bracket 38, and the left side 66 of the lower arm support 62 is disposed proximal the bottom edge 56 of the third section 44 of the second bracket 38. A vase holder 68 having a circular top ring 70 and a circular base 72 is suspended within an opening 74 in each of the upper arm support 60 and the lower arm support 62 at approximately one-third of a length of each of the pair of arm supports 58 from the left side 66 of each of the upper arm support 60 and the lower arm support 62. The vase holder 68 optionally includes a plurality of convexly curved substantially vertical columns 76, with each of the vertical columns 76 disposed between the top ring 70 and the base 72 of the vase holder 68.

The decorative headstone accessory apparatus 10 further includes a hinged double picture frame 78 having a first picture frame 80, a second picture frame 82, a hollow cylindrical middle section 84 disposed between the first picture frame 80 and the second picture frame 82, a cap 86 removably disposed within an upper surface 88 of the middle section 84, and a pair of removable pins 90. One of the pair of pins 90 is removably and slidably disposed within one of a pair of slots 92 continuously disposed along a bottom surface 94 of each of the first picture frame 80 and the second picture frame 82. The middle section 84 of the double picture frame 78 is attached to the right side 64 of each of the upper arm support 60 and the lower arm support 62. An optional diameter of the middle section 84 of the double picture frame 78 is 0.375 inches. A frontward facing pivotable extension 96 has a back edge 98, a front edge 100, and a circular candle guardrail 102 attached to the extension 96 proximal the front edge 100. The back edge 98 of the extension 96 is pivotally attached to the double picture frame 78 proximal a lower surface 104 of the middle section 84, and the candle guardrail 102 is outwardly disposed above the front edge 100 of the extension 96.

Each of the first bracket 28 and the second bracket 38 is configured to removably secure to a left surface 108 of a headstone 110 such that the pair of arm supports 58 is disposed in front of a front surface 112 of the headstone 110. A flag 114 is configured to be removably disposed within the middle section 84 of the double picture frame 78. The candle guardrail 102 of the extension 96 is configured to encircle a candle 116 removably disposed atop the extension 96 proximal the front edge 100. The interior surface 36 of each of the first portion 30 and the second portion 32 of the first bracket 28 and the internal surface 48 of each of the first section 40, the second section 42, and the third section 44 of the second bracket 38 optionally has a rubberized covering 118.

What is claimed is:
1. A decorative headstone accessory apparatus comprising:
an adjustable length slotted arm having a right end, a left end, and a removable bolt;
an L-shaped first bracket having a first portion and a frontward facing second portion, each of the first portion and the second portion having an exterior surface and an interior surface, wherein the slotted arm left end is medially attached to the exterior surface of the second portion;

a second bracket having a rearward facing first section, a second section, and a frontward facing third section, each of the first section, the second section, and the third section having an external surface, an internal surface, a right edge, a left edge, a top edge, and a bottom edge, wherein the first section right edge is attached at an angle of ninety degrees to the second section left edge, and the third section left edge is attached at an angle of ninety degrees to the second section right edge, wherein the slotted arm right end is medially attached to the external surface of the second bracket first section;

wherein a length of the second bracket first section is equal to a length of the first bracket second portion;

wherein a length of the second bracket second section is equal to a length of the first bracket first portion;

a pair of linear arm supports comprising an upper arm support and a lower arm support, each of the upper arm support and the lower arm support having a right side and a left side, wherein the left side of each of the upper arm support and the lower arm support is attached to the internal surface of the second bracket third section proximal the right edge, wherein the left side of the upper arm support is disposed proximal the top edge of the second bracket third section, and the left side of the lower arm support is disposed proximal the bottom edge of the second bracket third section;

a vase holder having a circular top ring and a circular base, the vase holder suspended within an opening in each of the upper arm support and the lower arm support at approximately one-third of a length of each of the pair of arm supports from the left side of each of the upper arm support and the lower arm support;

a hinged double picture frame having a first picture frame, a second picture frame, a hollow cylindrical middle section disposed between the first picture frame and the second picture frame, a cap removably disposed within an upper surface of the middle section, and a pair of removable pins, wherein one of the pair of pins is removably and slidably disposed within one of a pair of slots continuously disposed along a bottom surface of each of the first picture frame and the second picture frame, wherein the middle section is attached to the right side of each of the upper arm support and the lower arm support; and a frontward facing pivotable extension having a back edge, a front edge, and a circular candle guardrail attached to the extension proximal the front edge, wherein the back edge is pivotally attached to the double picture frame proximal a lower surface of the middle section, and the candle guardrail is outwardly disposed above the front edge;

wherein each of the first bracket and the second bracket is configured to removably secure to a left surface of a headstone such that the pair of arm supports is disposed in front of a front surface of the headstone;

wherein a flag is configured to be removably disposed within the double picture frame middle section;

wherein the candle guardrail of the extension is configured to encircle a candle removably disposed atop the extension proximal the front edge.

2. The decorative headstone accessory apparatus of claim 1 wherein the vase holder further comprises a plurality of convexly curved substantially vertical columns, each of the vertical columns disposed between the vase holder top ring and the vase holder base.

3. The decorative headstone accessory apparatus of claim 2 wherein the interior surface of each of the first portion and the second portion of the first bracket and the internal surface of each of the first section, the second section, and the third section of the second bracket has a rubberized covering.

* * * * *